(12) United States Patent
Dakemoto et al.

(10) Patent No.: US 11,884,260 B2
(45) Date of Patent: Jan. 30, 2024

(54) VEHICLE CONTROL DEVICE

(71) Applicant: TOYOTA JIDOSHA KABUSHIKI KAISHA, Toyota (JP)

(72) Inventors: Masumi Dakemoto, Nagoya (JP); Kaiji Itabashi, Nagoya (JP); Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 17/081,246

(22) Filed: Oct. 27, 2020

(65) Prior Publication Data

US 2021/0139015 A1 May 13, 2021

(30) Foreign Application Priority Data

Nov. 8, 2019 (JP) ................................. 2019-203253

(51) Int. Cl.
*B60W 30/02* (2012.01)
*B60W 10/10* (2012.01)
*B60W 10/18* (2012.01)
*B60W 10/20* (2006.01)
*B60W 30/06* (2006.01)
*B60W 30/09* (2012.01)

(Continued)

(52) U.S. Cl.
CPC ............ *B60W 30/02* (2013.01); *B60W 10/10* (2013.01); *B60W 10/18* (2013.01); *B60W 10/20* (2013.01); *B60W 30/06* (2013.01); *B60W 30/09* (2013.01); *B60W 30/12* (2013.01); *B60W 30/14* (2013.01); *B60W 2510/20* (2013.01); *B60W 2520/14* (2013.01); *B60W 2710/10* (2013.01); *B60W 2710/18* (2013.01); *B60W 2710/207* (2013.01)

(58) Field of Classification Search
CPC ...... B60W 30/02; B60W 10/10; B60W 10/18; B60W 10/20; B60W 30/06; B60W 30/09; B60W 30/12; B60W 30/14; B60W 2510/20; B60W 2520/14; B60W 2710/10; B60W 2710/18; B60W 2710/207; B60T 2270/402; B60T 8/1755; B62D 6/003
USPC .......................................................... 702/41
See application file for complete search history.

(56) References Cited

U.S. PATENT DOCUMENTS 9,971,352 B1 * 5/2018 Mudalige ............ B60W 50/023
10,407,035 B1 * 9/2019 Gadda ................... B60W 10/04
(Continued)

FOREIGN PATENT DOCUMENTS

DE 102010017647 A1 * 1/2011 .......... B60T 8/17554
DE 102010017647 A1 1/2011
(Continued)

*Primary Examiner* — Jonathan M Dager
*Assistant Examiner* — Jean W Charleston
(74) *Attorney, Agent, or Firm* — Oliff PLC

(57) ABSTRACT

The vehicle control device includes an arbitration unit configured to arbitrate between a plurality of control commands acquired from a plurality of driving support applications that respectively implements driving support functions, configured to output instructions based on a control command after arbitration to a first control unit that is able to control a steering actuator and a second control unit that is able to control at least one of a brake actuator or a drive actuator, and configured to acquire a steering angle and a yaw rate as the control commands from the driving support applications.

7 Claims, 4 Drawing Sheets

(51) Int. Cl.
*B60W 30/12* (2020.01)
*B60W 30/14* (2006.01)

(56) References Cited

U.S. PATENT DOCUMENTS

| | | | | |
|---|---|---|---|---|
| 2008/0288150 | A1* | 11/2008 | Isogai | B60T 7/22 |
| | | | | 701/70 |
| 2011/0015844 | A1* | 1/2011 | Perkins | B60T 8/17554 |
| | | | | 701/69 |
| 2012/0179349 | A1* | 7/2012 | Yamakado | B60W 30/045 |
| | | | | 701/89 |
| 2014/0005890 | A1* | 1/2014 | Tanaka | B60T 8/17552 |
| | | | | 701/38 |
| 2014/0358373 | A1* | 12/2014 | Kikuchi | B60G 17/0185 |
| | | | | 701/38 |
| 2015/0046035 | A1* | 2/2015 | Kikuchi | B60G 17/0195 |
| | | | | 701/37 |
| 2015/0239442 | A1* | 8/2015 | Yamakado | B60W 10/08 |
| | | | | 701/70 |
| 2015/0291216 | A1* | 10/2015 | Sato | B60W 30/0956 |
| | | | | 701/41 |
| 2016/0059852 | A1* | 3/2016 | Yamakado | B60W 30/045 |
| | | | | 701/41 |
| 2017/0029026 | A1* | 2/2017 | Okuda | B62D 15/025 |
| 2019/0361439 | A1* | 11/2019 | Zeng | B60W 50/0097 |
| 2019/0367044 | A1* | 12/2019 | Nakagawara | B60W 30/18 |

FOREIGN PATENT DOCUMENTS

| | | | |
|---|---|---|---|
| DE | 102013212808 A1 * | 1/2014 | ............ B60G 99/00 |
| DE | 102013212808 A1 | 1/2014 | |
| EP | 3511226 A1 | 7/2019 | |
| JP | 2017-030472 A | 2/2017 | |
| JP | 2018-167732 A | 11/2018 | |
| WO | 2014/083649 A1 | 6/2014 | |

* cited by examiner

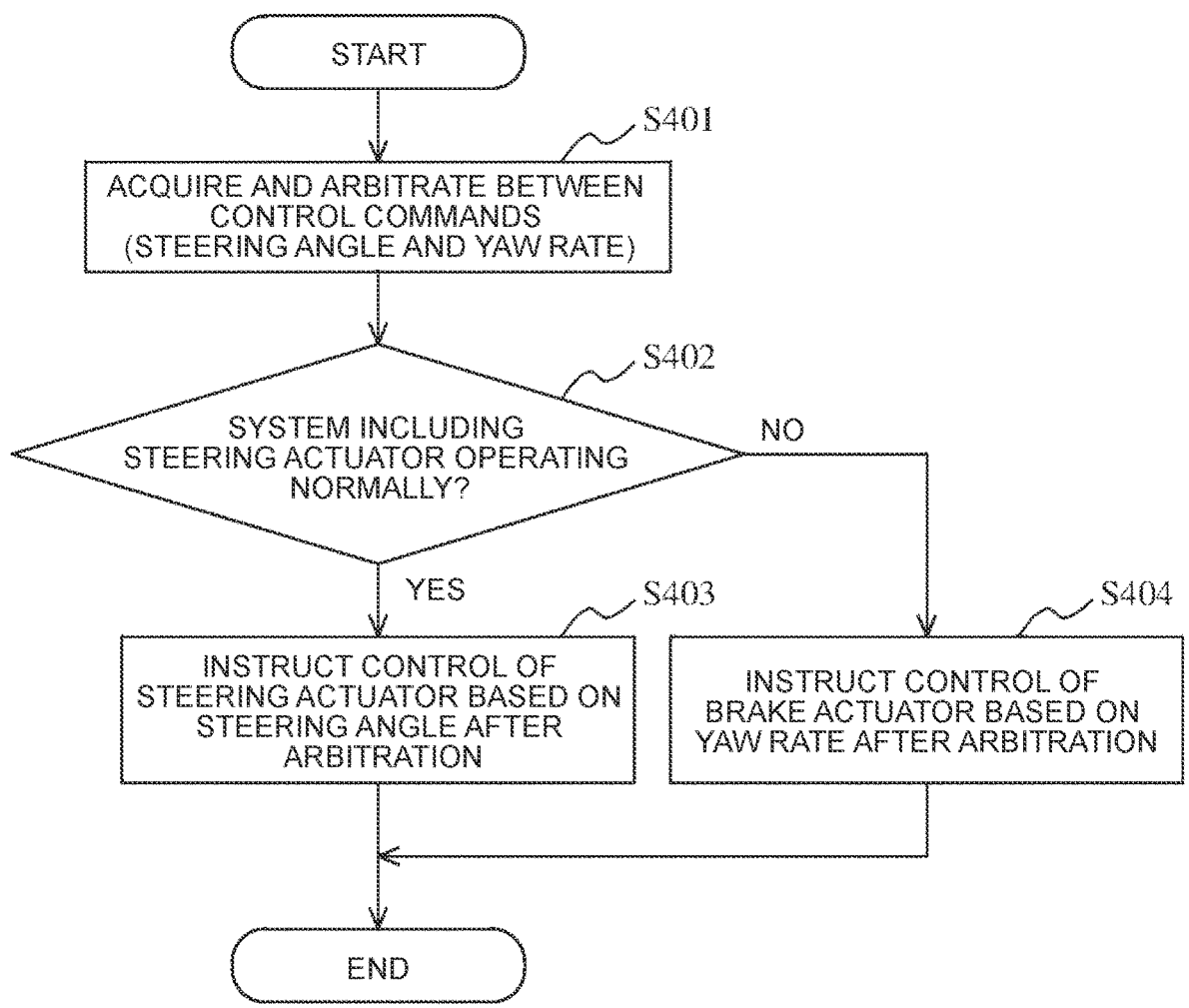

VEHICLE CONTROL DEVICE

CROSS-REFERENCE TO RELATED APPLICATION

This application claims priority to Japanese Patent Application No. 2019-203253 filed on Nov. 8, 2019, incorporated herein by reference in its entirety.

BACKGROUND

1. Technical Field

The disclosure relates to a vehicle control device.

2. Description of Related Art

There is a known vehicle that can arbitrate between a plurality of control commands related to the movement of the vehicle and generated in the vehicle so as to control operation of an actuator in accordance with the arbitration result. Japanese Unexamined Patent Application Publication No. 2017-030472 (JP 2017-030472 A) discloses a device in which a steering command of a collision avoidance assistance control unit and a steering command of a lane departure assistance control unit are input to an arbitration control unit as a steering angle or a steering torque, and the arbitration control unit arbitrates between the steering commands.

SUMMARY

In the control device described in JP 2017-030472 A, for example, if the steering actuator cannot be controlled in accordance with the steering command due to a failure or the like in an attempt to control the steering actuator based on the steering angle received as the steering command, the behavior of the vehicle may fail to become as expected and the lateral movement of the vehicle may fail to be appropriately controlled.

The disclosure provides a vehicle control device that can appropriately control lateral movement of a vehicle.

A first aspect of the disclosure provides a vehicle control device including an arbitration unit. The arbitration unit is configured to arbitrate between a plurality of control commands acquired from a plurality of driving support applications that respectively implements driving support functions, configured to output instructions based on a control command after arbitration to a first control unit that is able to control a steering actuator and a second control unit that is able to control at least one of a brake actuator or a drive actuator, and configured to acquire a steering angle and a yaw rate as the control commands from the driving support applications.

In the first aspect, the arbitration unit may be configured to output an instruction based on the steering angle serving as the control command after arbitration to the first control unit in a case where the control command after arbitration is able to be realized only by controlling the steering actuator, and configured to output an instruction based on at least the yaw rate serving as the control command after arbitration to the second control unit in a case where the control command after arbitration is not able to be realized only by controlling the steering actuator.

In the first aspect, the case where the control command after arbitration is not be able to be realized only by controlling the steering actuator may be a case where a system including the steering actuator is not normal.

In the first aspect, the case where the control command after arbitration is not able to be realized only by controlling the steering actuator may be a case where the steering angle serving as the control command after arbitration exceeds a maximum steering angle of the steering actuator.

In the first aspect, the case where the control command after arbitration is not able to be realized only by controlling the steering actuator may be a case where the steering angle serving as the control command after arbitration deviates, by a predetermined value or more, from an actual steering angle of the steering actuator that has operated in accordance with the instruction based on the steering angle.

In the first aspect, the arbitration unit may acquire the steering angle and the yaw rate as the control commands from the driving support applications at substantially the same time.

In the first aspect, the arbitration unit may acquire a data frame including the steering angle and the yaw rate as the control commands from the driving support applications.

In the first aspect, the brake actuator may be able to distribute a braking force between right and left wheels.

In the first aspect, the drive actuator may be able to distribute a driving force between right and left wheels.

A second aspect of the disclosure provides a vehicle control device including an arbitration unit. The arbitration unit is configured to arbitrate between a plurality of control commands acquired from a plurality of driving support applications that respectively implements driving support functions, configured to output an instruction based on a control command after arbitration to a first control unit that is able to control a steering actuator and a second control unit that is able to control at least one of a brake actuator and a drive actuator, and configured to acquire information that allows a steering angle and a yaw rate serving as the control commands to be specified from the driving support applications.

A third aspect of the disclosure provides a vehicle control device including an electronic control unit. The electronic control unit is configured to arbitrate between a plurality of control commands acquired from a plurality of driving support applications that respectively implements driving support functions, configured to output instructions based on a control command after arbitration to a first control unit that is able to control a steering actuator and a second control unit that is able to control at least one of a brake actuator or a drive actuator, and configured to acquire a steering angle and a yaw rate as the control commands from the driving support applications.

With the vehicle control device of the disclosure, it is possible to appropriately control the lateral movement of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart illustrating a process executed by the vehicle control device of the second embodiment.

DETAILED DESCRIPTION OF EMBODIMENTS

A vehicle control device according to the disclosure acquires, as control commands, a steering angle and a yaw rate related to lateral movement of a vehicle from applications that implement driving support functions. Accordingly, the vehicle control device can prepare control of a brake or drive actuator based on the yaw rate, in parallel with control of a steering actuator based on the steering angle. Thus, the vehicle control device can appropriately control the lateral movement of the vehicle using the braking or the drive actuator, even if the steering angle indicated by the control command of the application cannot be realized by the steering actuator.

First Embodiment

Configuration

Figure 1:
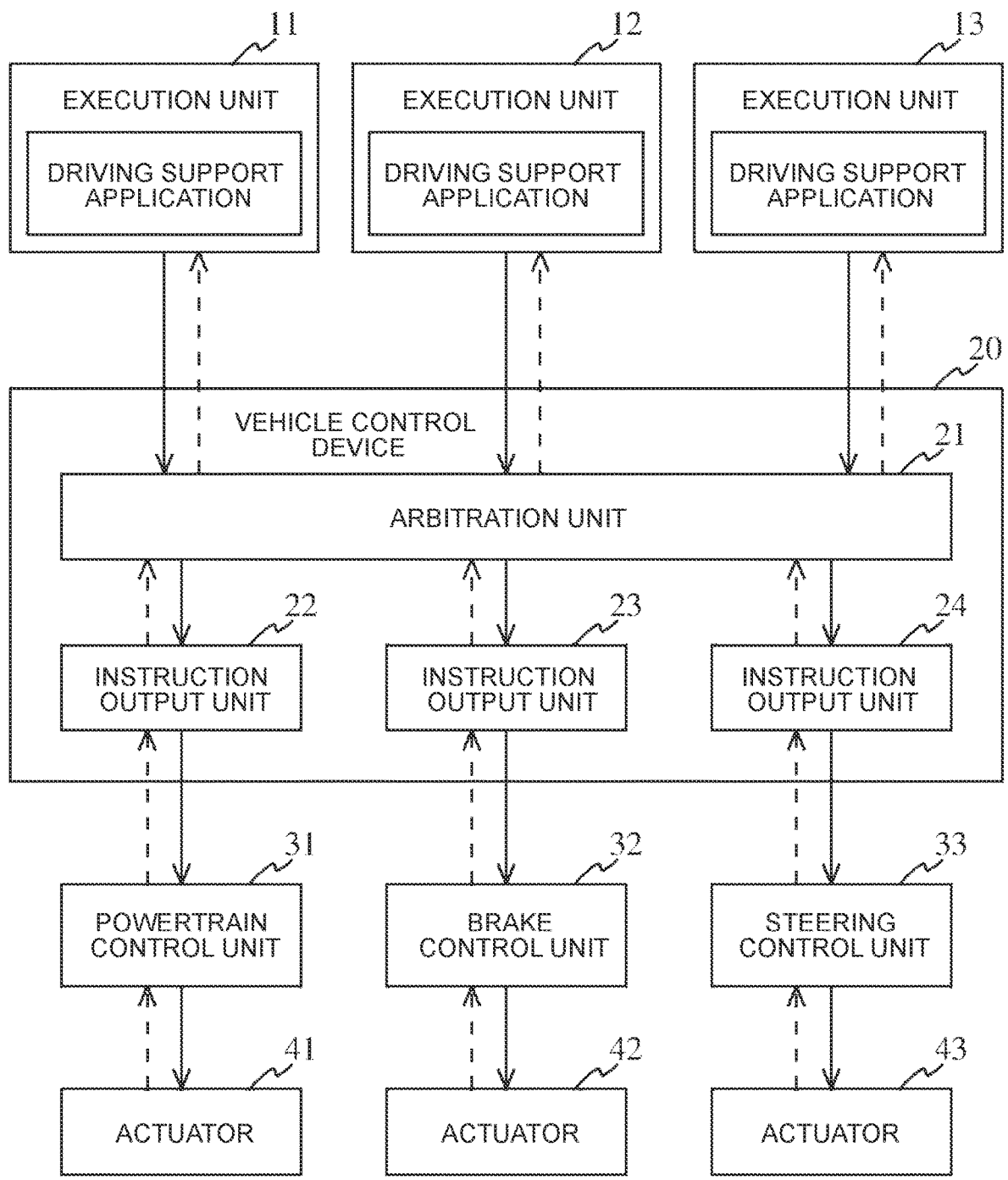
FIG. 1 is a functional block diagram of a vehicle control device and its peripheral components according to a first embodiment of the disclosure.

FIG. 1 is a functional block diagram of a vehicle control device 20 and its peripheral components according to a first embodiment of the disclosure. The functional blocks illustrated in FIG. 1 include a plurality of execution units 11 to 13, the vehicle control device 20, a powertrain control unit 31, a brake control unit 32, a steering control unit 33, and actuators 41 to 43. These configurations are connected via an in-vehicle network such as Controller Area Network (CAN) or Ethernet (registered trademark) so as to communicate with each other. Note that arrows in FIG. 1 schematically show exemplary flows of information, and an actual connection mode of the communication lines is not limited.

The execution units 11 to 13 are configured to execute driving support applications to implement vehicle driving support functions such as autonomous driving, automatic parking, adaptive cruise control, lane keeping assist, and collision mitigation braking. The execution units 11 to 13 are realized by a computer such as an electronic control unit (ECU) having a processor such as a central processing unit (CPU) and a memory. The execution units 11 to 13 implement different driving support functions and can operate simultaneously. The number of execution units mounted on the vehicle is not limited to three as shown in FIG. 1 and may be two or less and four or more. The execution units 11 to 13 output control commands for requesting the operations of the actuators 41 to 43.

The vehicle control device 20 determines content of the control related to the movement of the vehicle such as "run", "turn" and "stop", based on the control commands from the execution units 11 to 13, and issues necessary instructions to the powertrain control unit 31, the brake control unit 32, and the steering control unit 33 (further, a shift control unit (not shown)) based on the determined content of the control. Thus, the vehicle control device 20 functions as a movement manager that appropriately controls the actuators 41 to 43 involved in the movement of the vehicle or as a part of the movement manager to control the lateral movement of the vehicle. The vehicle control device 20 may be a device that exclusively controls the lateral movement of the vehicle. The vehicle control device 20 includes an arbitration unit 21 and a plurality of instruction output units 22 to 24.

The arbitration unit 21 acquires the control commands output from the driving support applications of the execution units 11 to 13 and arbitrates between the acquired control commands. The control commands that the arbitration unit 21 acquires from the driving support applications include the steering angle and the yaw rate that are control amounts related to the lateral movement of the vehicle. The control commands may include, for example, a vehicle speed instead of the yaw rate. The yaw rate can be specified by the steering angle and the vehicle speed. As described above, the control commands acquired by the arbitration unit 21 from the execution units 11 to 13 need not explicitly specify the steering angle and the yaw rate information and only need to include information that allows the steering angle and the yaw rate to be specified. The arbitration unit 21 acquires the steering angle and the yaw rate (or information that allows the yaw rate to be specified) from the execution units 11 to 13 at substantially the same time. To acquire at substantially the same time means that the steering angle and the yaw rate are acquired at the same timing, and also means that even if the control is performed based on the acquired yaw rate, the vehicle behavior resulting from the control includes a timing error that is comparable to that of the vehicle behavior in the case where the control is performed based on the acquired steering angle. As an example, in CAN, Ethernet, etc., the steering angle and the yaw rate are stored in the same data frame and are transmitted and received between the execution units 11 to 13 and the vehicle control device 20.

As an arbitration process, the arbitration unit 21 selects, for example, one control command from a plurality of control commands acquired based on a predetermined selection criterion, or sets a new control command based on the acquired control commands. The result of the arbitration process may be fed back from the arbitration unit 21 to the execution units 11 to 13. In addition, the arbitration unit 21 may execute the arbitration process based on information indicating operating states of the actuators 41 to 43 and availabilities representing the currently operable performance ranges of the actuators 41 to 43. The information is sent from the powertrain control unit 31, the brake control unit 32, and the steering control unit 33, which will be described later.

Further, based on the control command obtained through the arbitration, the arbitration unit 21 can instruct, via the instruction output units 22 to 24, one of or two or more of the powertrain control unit 31, the brake control unit 32, and the steering control unit 33 to control the lateral movement of the vehicle that is required by the driving support applications. The lateral movement of the vehicle can be realized by controlling steering of the steering device, generation of braking force by the brake device, and generation of driving force or braking force by the powertrain, individually or in combination. The arbitration unit 21 can control the lateral movement of the vehicle based on a determination as to whether a control command after arbitration can be realized only by controlling the actuator 43 that is a steering actuator. Details of this control will be described later. The arbitration unit 21 may provide an instruction of the control related to the lateral movement of the vehicle based on the information indicating the operating states and the availabilities of the actuators 41 to 43 acquired from the powertrain control unit 31, the brake control unit 32, and the steering control unit 33 via the instruction output units 22 to 24.

The instruction output unit 22 generates instruction information for causing the actuator 41 included in the powertrain to generate a driving force or a braking force based on the control command after the arbitration by the arbitration unit 21. The instruction information generated by the instruction output unit 22 is acquired by the powertrain control unit 31.

The instruction output unit 23 generates instruction information for causing the actuator 42 included in the brake device to generate a braking force based on the control command after the arbitration by the arbitration unit 21. The instruction information generated by the instruction output unit 23 is acquired by the brake control unit 32.

The instruction output unit 24 generates instruction information for causing the actuator 43 included in the steering device to generate a steering angle based on the control command after the arbitration by the arbitration unit 21. The instruction information generated by the instruction output unit 24 is acquired by the steering control unit 33.

The powertrain control unit 31 controls the operation of the actuator 41 that is one of the drive actuators and constitutes the powertrain, to generate the driving force instructed by the instruction output unit 22 (four-wheel drive). The actuator 41 is typically an actuator that generates a driving force, but is also a brake actuator that can generate a braking force that can be distributed between the right and left wheels by so-called engine braking, downshifting, or the like. The powertrain control unit 31 is realized by, for example, any one of or a combination of an engine control ECU, a hybrid control ECU, a transmission ECU, etc., depending on the configuration of the powertrain. Although FIG. 1 shows the single actuator 41 that is controlled by the powertrain control unit 31, the number of actuators controlled by the powertrain control unit 31 may be two or more depending on the configuration of the powertrain of the vehicle. Examples of the actuator 41 that constitutes the powertrain include an engine, a drive motor, a clutch, a transmission, and a torque converter. In addition, the powertrain control unit 31 acquires information regarding the operating state of the actuator 41 based on a signal output from the actuator 41 or a measurement value of the sensor. Examples of the information regarding the operating state of the actuator 41 include information indicating the availability of the actuator 41, information indicating a monitored value of the driving force realized by the actuator 41, and the like. The information regarding the operating state of the actuator 41, which is acquired by the powertrain control unit 31, is acquired by the instruction output unit 22.

The brake control unit 32 controls the actuator 42 that is one of the brake actuators and that actuates the brake device provided in each wheel, (for example, controls four wheels independently or controls two left wheels and two right wheels independently), so that the braking force instructed by the instruction output unit 23 is generated. The brake actuator includes a hydraulic brake that can distribute the braking force between the right and left wheels and a regenerative brake such as an in-wheel motor (IWM). The brake control unit 32 is realized by, for example, a brake control ECU. An output value of a wheel speed sensor provided in each wheel is input to the brake control unit 32. In addition, the brake control unit 32 acquires information regarding the operating state of the actuator 42 based on a signal output from the actuator 42 or a measurement value of the sensor. Examples of the information regarding the operating state of the actuator 42 include information unique to the actuator 42 such as whether the temperature of a brake pad is shifting toward overheating, in addition to the information indicating the availability described above and the information indicating a monitored value of the braking force realized by the actuator 42. The information regarding the operating state of the actuator 42 acquired by the brake control unit 32 is acquired by the instruction output unit 23.

Figure 2:
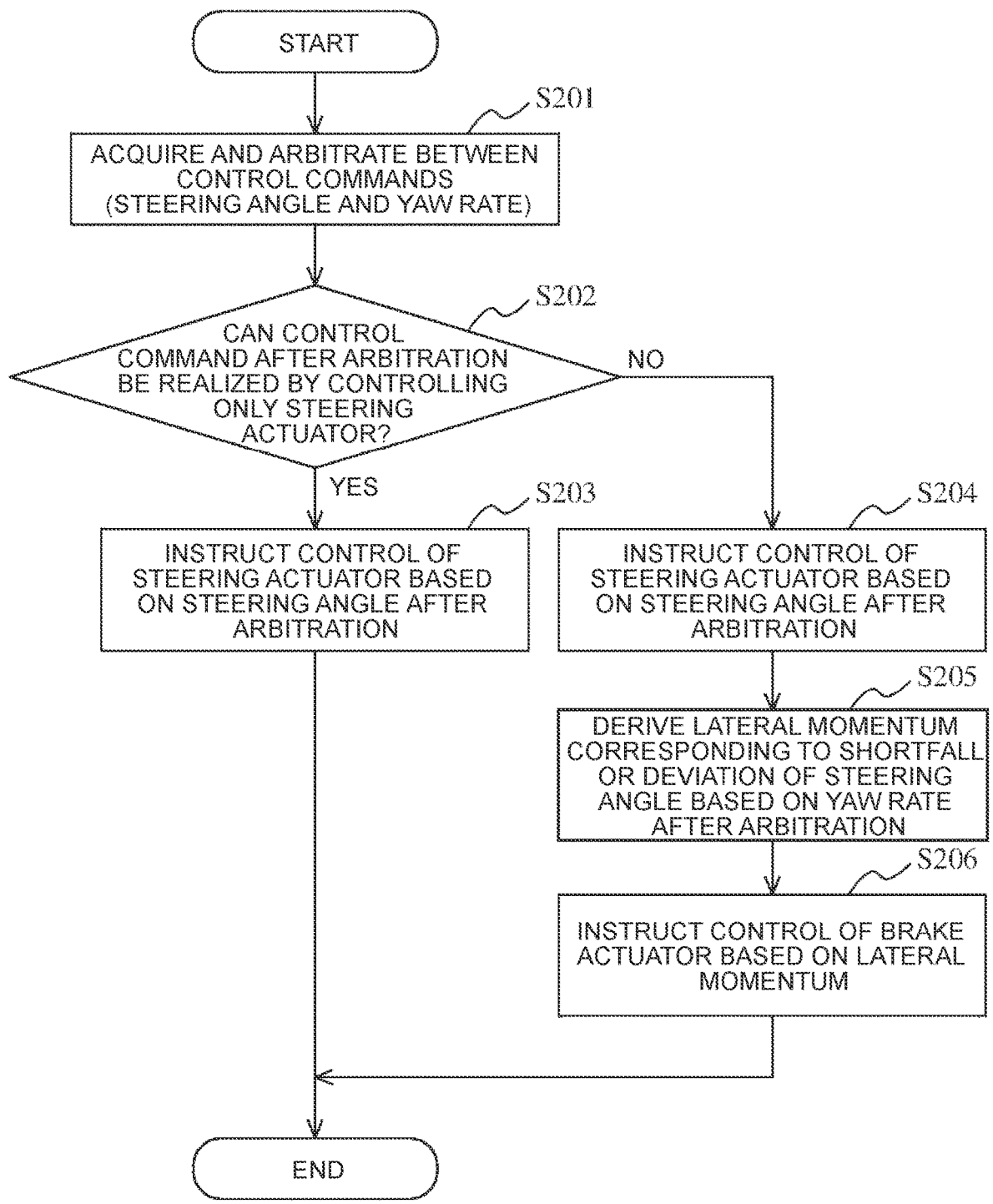
FIG. 2 is a flowchart illustrating a process executed by the vehicle control device of the first embodiment.

The steering control unit 33 controls the steering angle of the steering wheel by controlling the actuator 43 that is one of the steering actuators and is included in the electric power steering (EPS) system. The steering control unit 33 is realized by, for example, a power steering control ECU. Further, the steering control unit 33 acquires information regarding the operating state of the actuator 43 based on a signal output from the actuator 43 or a measurement value of the sensor. Examples of the information regarding the operating state of the actuator 43 include the information indicating the availability described above, the information indicating a monitored value of the steering angle realized by the actuator 43, and the like. The information regarding the operating state of the actuator 43 acquired by the steering control unit 33 is acquired by the instruction output unit 24.
Control With reference to FIG. 2 as well, a steering control process executed by the vehicle control device 20 according to the first embodiment will be described. FIG. 2 is a flowchart illustrating the steering control process executed by the vehicle control device 20. The steering control process shown in FIG. 2 can be executed in a predetermined cycle, for example.
Step S201

The arbitration unit 21 of the vehicle control device 20 acquires the steering angle and the yaw rate (or the information that allows the yaw rate to be specified) as the control commands output from the driving support applications of the execution units 11 to 13, and arbitrates between the acquired control commands. When there is only one control command acquired from the execution units 11 to 13, this control command is adopted as the control command after arbitration.
Step S202

The arbitration unit 21 of the vehicle control device 20 determines whether the control command after arbitration can be realized only by controlling the actuator 43 that is the steering actuator. More specifically, when a steering angle M serving as the control command after arbitration is equal to or less than a maximum steering angle δ2 of the actuator 43 (δ≤δ2), the arbitration unit 21 determines that the control command after arbitration can be realized. When the steering angle M exceeds the maximum steering angle δ2 of the actuator 43 (δ1>δ2), the arbitration unit 21 determines that the control command after arbitration cannot be realized. Even when the steering angle M serving as the control command after arbitration is equal to or less than the maximum steering angle δ2 of the actuator 43, the arbitration unit 21 may determine that the control command after arbitration cannot be realized if an actual steering angle δ3 of the actuator 43 operated in accordance with the instruction based on the steering angle δ1 deviates from the steering angle δ1 by a predetermined value a or more (δ1>δ3+α). When the control command can be realized (step S202, Yes), the process proceeds to step S203, and when the control command cannot be realized (step S202, No), the process proceeds to step S204.
Step S203

The instruction output unit 24 of the vehicle control device 20 causes the steering control unit 33 to perform control for causing the actuator 43 that is the steering actuator to generate a steering angle based on the steering angle serving as the control command after arbitration. Thus, the steering control process ends.

Step S204

The instruction output unit 24 of the vehicle control device 20 causes the steering control unit 33 to perform control for causing the actuator 43 that is the steering actuator to generate a steering angle based on the steering angle serving as the control command after arbitration.

Step S205

Based on the yaw rate serving as the control command after arbitration, the arbitration unit 21 of the vehicle control device 20 derives a lateral momentum corresponding to an amount by which the maximum steering angle δ2 of the actuator 43 is short of the steering angle δ1 (=δ1−δ2), or a lateral momentum corresponding to a deviation of the actual steering angle δ3 from the steering angle δ1 (=δ1−δ3).

Step S206

The instruction output unit 23 of the vehicle control device 20 causes the brake control unit 32 to perform control for causing the actuator 42 that is the brake actuator to generate a braking force for realizing a yaw rate based on the lateral momentum derived by the arbitration unit 21. Specifically, based on a yaw rate value acquired by the yaw rate sensor mounted on the vehicle, the control is performed so that an actual yaw rate follows the commanded yaw rate. When the lateral momentum generated by the brake actuator is a certain amount or more, control is performed to causing the yaw rate to gradually approach the target value, thereby suppressing an extreme change in the behavior of the vehicle. Thus, the steering control process ends.

In step S206, the instruction output unit 22 of the vehicle control device 20 may cause the powertrain control unit 31 to perform the control for causing the actuator 41 functioning as the brake actuator to generate a braking force for realizing the yaw rate based on the lateral momentum derived by the arbitration unit 21. Further, when the lateral momentum derived by the arbitration unit 21 is realized with the driving force rather than the braking force, the instruction output unit 22 may cause the powertrain control unit 31 to perform the control for causing the actuator 41 functioning as the drive actuator to generate a driving force for realizing the yaw rate. That is, in order to realize the lateral momentum derived by the arbitration unit 21 with the yaw rate, only the brake actuator may be controlled, only the drive actuator may be controlled, or both the brake actuator and the drive actuator may be controlled.

Further, when the control command after arbitration cannot be realized only by controlling the actuator 43 that is the steering actuator and the lateral momentum is realized using the steering control by the steering device together with the braking force control or the driving force control by the brake device or the powertrain, the execution units 11 to 13 may be notified that the two controls are used (the steering control is supplemented by the braking force control or the driving force control).

Operations and Effects

As described above, in the vehicle control device according to the first embodiment of the disclosure, the arbitration unit acquires, as the control commands, the steering angle and the yaw rate (or the steering angle and the information that allows the yaw rate to be specified) that are the control amounts that allow the control of the actuators different from each other regarding the lateral movement of the vehicle, from the driving support applications of the execution units at substantially the same time.

By setting the control commands to such control amounts, the arbitration unit can prepare the control of the brake actuator or the drive actuator based on the yaw rate in parallel with the control of the steering actuator based on the steering angle when acquiring the control commands from the driving support applications of the execution units. Thus, even if the steering angle indicated by the control command of the driving support application cannot be realized only by the steering actuator, the brake actuator or the drive actuator can be controlled based on the yaw rate without inquiring the execution unit and waiting for a new control command. Thus, it is possible to realize a turning performance that exceeds a turning performance realized only by steering (steering limit turning performance). As a result, it is possible to reduce situations where the behavior of the vehicle does not become as expected or the responsiveness of the vehicle deteriorates, so that the lateral movement of the vehicle can be appropriately controlled.

Second Embodiment

Configuration

Figure 3:
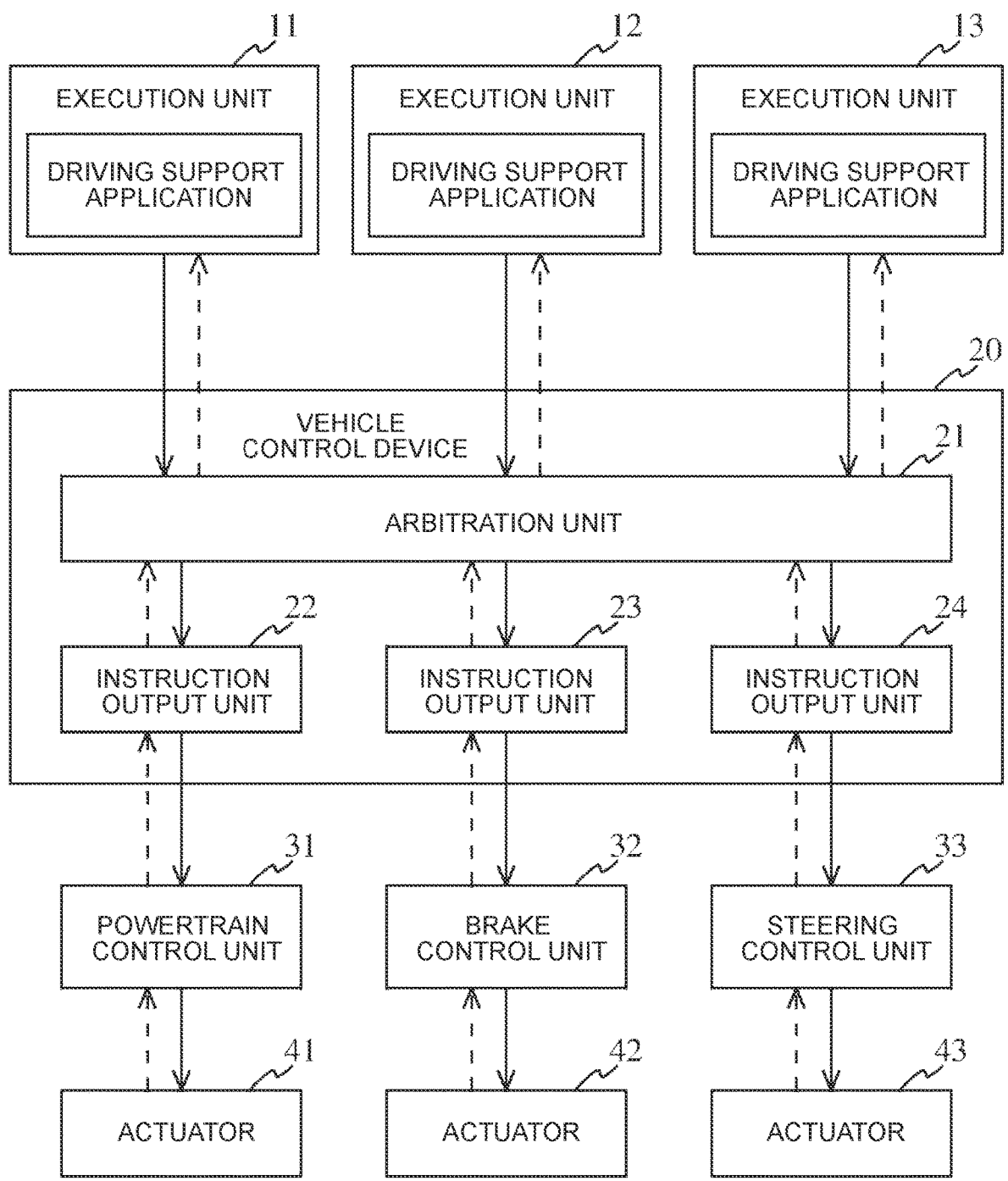
FIG. 3 is a functional block diagram of a vehicle control device and its peripheral components according to a second embodiment of the disclosure.

FIG. 3 is a functional block diagram of a vehicle control device 20 and its peripheral components according to a second embodiment of the disclosure. The functional blocks illustrated in FIG. 3 include a plurality of execution units 11 to 13, the vehicle control device 20, a powertrain control unit 31, a brake control unit 32, a steering control unit 33, and actuators 41 to 43. These configurations are connected via an in-vehicle network such as Controller Area Network (CAN) or Ethernet (registered trademark) so as to communicate with each other. Note that arrows in FIG. 3 schematically show exemplary flows of information, and an actual connection mode of the communication lines is not limited.

The execution units 11 to 13 are configured to execute driving support applications to implement vehicle driving support functions such as autonomous driving, automatic parking, adaptive cruise control, lane keeping assist, and collision mitigation braking. The execution units 11 to 13 are realized by a computer such as an electronic control unit (ECU) having a processor such as a central processing unit (CPU) and a memory. The execution units 11 to 13 implement different driving support functions and can operate simultaneously. The number of execution units mounted on the vehicle is not limited to three as shown in FIG. 1 and may be two or less and four or more. The execution units 11 to 13 output control commands for requesting the operations of the actuators 41 to 43.

The vehicle control device 20 determines content of the control related to the movement of the vehicle such as "run", "turn" and "stop", based on the control commands from the execution units 11 to 13, and issues necessary instructions to the powertrain control unit 31, the brake control unit 32, and the steering control unit 33 (further, a shift control unit (not shown)) based on the determined content of the control. Thus, the vehicle control device 20 functions as a movement manager that appropriately controls the actuators 41 to 43 involved in the movement of the vehicle or as a part of the movement manager to control the lateral movement of the vehicle. The vehicle control device 20 may be a device that exclusively controls the lateral movement of the vehicle. The vehicle control device 20 includes an arbitration unit 21 and a plurality of instruction output units 22 to 24.

The arbitration unit 21 acquires the control commands output from the driving support applications of the execution units 11 to 13 and arbitrates between the acquired control commands. The control commands that the arbitration unit 21 acquires from the driving support applications include the steering angle and the yaw rate that are control amounts related to the lateral movement of the vehicle. The control commands may include, for example, a vehicle speed instead of the yaw rate. The yaw rate can be specified by the steering angle and the vehicle speed. As described above, the control commands acquired by the arbitration unit 21 from the execution units 11 to 13 need not explicitly specify the steering angle and the yaw rate information and only need to include information that allows the steering angle and the yaw rate to be specified. The arbitration unit 21 acquires the steering angle and the yaw rate (or information that allows the yaw rate to be specified) from the execution units 11 to 13 at substantially the same time. To acquire at substantially the same time means that the steering angle and the yaw rate are acquired at the same timing, and also means that even if the control is performed based on the acquired yaw rate, the vehicle behavior resulting from the control includes a timing error that is comparable to that of the vehicle behavior in the case where the control is performed based on the acquired steering angle. As an example, in CAN, Ethernet, etc., the steering angle and the yaw rate are stored in the same data frame and are transmitted and received between the execution units 11 to 13 and the vehicle control device 20.

As an arbitration process, the arbitration unit 21 selects, for example, one control command from a plurality of control commands acquired based on a predetermined selection criterion, or sets a new control command based on the acquired control commands. The result of the arbitration process may be fed back from the arbitration unit 21 to the execution units 11 to 13. In addition, the arbitration unit 21 may execute the arbitration process based on information indicating operating states of the actuators 41 to 43 and availabilities representing the currently operable performance ranges of the actuators 41 to 43. The information is sent from the powertrain control unit 31, the brake control unit 32, and the steering control unit 33, which will be described later.

Further, based on the control command obtained through the arbitration, the arbitration unit 21 can instruct, via the instruction output units 22 to 24, one of or two or more of the powertrain control unit 31, the brake control unit 32, and the steering control unit 33 to control the lateral movement of the vehicle that is required by the driving support applications. The lateral movement of the vehicle can be realized by controlling steering of the steering device, generation of braking force by the brake device, and generation of driving force or braking force by the powertrain, individually or in combination. The arbitration unit 21 can control the lateral movement of the vehicle based on the determination as to whether the system including the actuator 43 that is the steering actuator is operating normally. Details of this control will be described later. The arbitration unit 21 may provide an instruction of the control related to the lateral movement of the vehicle based on the information indicating the operating states and the availabilities of the actuators 41 to 43 acquired from the powertrain control unit 31, the brake control unit 32, and the steering control unit 33 via the instruction output units 22 to 24.

The instruction output unit 22 generates instruction information for causing the actuator 41 included in the powertrain to generate a driving force or a braking force based on the control command after the arbitration by the arbitration unit 21. The instruction information generated by the instruction output unit 22 is acquired by the powertrain control unit 31.

The instruction output unit 23 generates instruction information for causing the actuator 42 included in the brake device to generate a braking force based on the control command after the arbitration by the arbitration unit 21. The instruction information generated by the instruction output unit 23 is acquired by the brake control unit 32.

The instruction output unit 24 generates instruction information for causing the actuator 43 included in the steering device to generate a steering angle based on the control command after the arbitration by the arbitration unit 21. The instruction information generated by the instruction output unit 24 is acquired by the steering control unit 33.

The powertrain control unit 31 controls the operation of the actuator 41 that is one of the drive actuators and constitutes the powertrain, to generate the driving force instructed by the instruction output unit 22 (four-wheel drive). The actuator 41 is typically an actuator that generates a driving force, but is also a brake actuator that can generate a braking force that can be distributed between the right and left wheels by so-called engine braking, downshifting, or the like. The powertrain control unit 31 is realized by, for example, any one of or a combination of an engine control ECU, a hybrid control ECU, a transmission ECU, etc., depending on the configuration of the powertrain. Although FIG. 1 shows the single actuator 41 that is controlled by the powertrain control unit 31, the number of actuators controlled by the powertrain control unit 31 may be two or more depending on the configuration of the powertrain of the vehicle. Examples of the actuator 41 that constitutes the powertrain include an engine, a drive motor, a clutch, a transmission, and a torque converter. In addition, the powertrain control unit 31 acquires information regarding the operating state of the actuator 41 based on a signal output from the actuator 41 or a measurement value of the sensor. Examples of the information regarding the operating state of the actuator 41 include information indicating the availability of the actuator 41 (including information indicating whether there is a failure in the actuator 41), information indicating a monitored value of the driving force realized by the actuator 41, and the like. The information regarding the operating state of the actuator 41, which is acquired by the powertrain control unit 31, is acquired by the instruction output unit 22.

The brake control unit 32 controls the actuator 42 that is one of the brake actuators and that actuates the brake device provided in each wheel, (for example, controls four wheels independently or controls two left wheels and two right wheels independently), so that the braking force instructed by the instruction output unit 23 is generated. The brake actuator includes a hydraulic brake that can distribute the braking force between the right and left wheels and a regenerative brake such as an in-wheel motor (IWM). The brake control unit 32 is realized by, for example, a brake control ECU. An output value of a wheel speed sensor provided in each wheel is input to the brake control unit 32. In addition, the brake control unit 32 acquires information regarding the operating state of the actuator 42 based on a signal output from the actuator 42 or a measurement value of the sensor. Examples of the information regarding the operating state of the actuator 42 include information unique to the actuator 42 such as whether the temperature of a brake pad is shifting toward overheating, in addition to the information indicating the availability described above and the information indicating a monitored value of the braking force realized by the actuator 42. The information regarding the operating state of the actuator 42 acquired by the brake control unit 32 is acquired by the instruction output unit 23.

The steering control unit 33 controls the steering angle of the steering wheel by controlling the actuator 43 that is one of the steering actuators and is included in the electric power steering (EPS) system. The steering control unit 33 is realized by, for example, a power steering control ECU. Further, the steering control unit 33 acquires information regarding the operating state of the actuator 43 based on a signal output from the actuator 43 or a measurement value of the sensor. Examples of the information regarding the operating state of the actuator 43 include the information indicating the availability described above, the information indicating a monitored value of the steering angle realized by the actuator 43, and the like. The information regarding the operating state of the actuator 43 acquired by the steering control unit 33 is acquired by the instruction output unit 24.

Control

With reference to FIG. 4 as well, a steering control process executed by the vehicle control device 20 according to the second embodiment will be described. FIG. 4 is a flowchart illustrating the steering control process executed by the vehicle control device 20. The steering control process shown in FIG. 4 can be executed in a predetermined cycle, for example.

Step S401

The arbitration unit 21 of the vehicle control device 20 acquires the steering angle and the yaw rate (or the information that allows the yaw rate to be specified) as the control commands output from the driving support applications of the execution units 11 to 13, and arbitrates between the acquired control commands. When there is only one control command acquired from the execution units 11 to 13, this control command is adopted as the control command after arbitration.

Step S402

The arbitration unit 21 of the vehicle control device 20 determines whether the system including the actuator 43 that is the steering actuator is operating normally. Examples of the event that the system is not operating normally include a failure of the actuator 43 of the electric power steering (EPS) system, a failure of the ECU that controls the actuator 43 such as the steering control unit 33, a fault in the signal or command to the steering control unit 33 for controlling the actuator 43, and a reduction in the power supplied to the ECU. Whether the system is operating normally can be determined by the arbitration unit 21 acquiring a self-diagnosis result from the steering control unit 33 when the steering control unit 33 has a self-diagnosis function. When the arbitration unit 21 acquires a self-diagnosis result indicating a failure or cannot acquire a self-diagnosis result indicating a normality, the arbitration unit 21 can determine that the system including the actuator 43 is not operating normally (has a failure). When the system is operating normally (step S402, Yes), the process proceeds to step S403, and when the system is not operating normally (step S402, No), the process proceeds to step S404.

Step S403

The instruction output unit 24 of the vehicle control device 20 causes the steering control unit 33 to perform control for causing the actuator 43 that is the steering actuator to generate a steering angle based on the steering angle serving as the control command after arbitration. Thus, the steering control process ends.

Step S404

The instruction output unit 23 of the vehicle control device 20 causes the brake control unit 32 to perform control for causing the actuator 42 that is the brake actuator to generate a braking force for realizing a yaw rate based on the yaw rate serving as the control command after arbitration. This control can be performed, for example, to gradually increase the control target value of the braking force of the actuator 42 that is the brake actuator, as gradually bringing the control target value of the steering angle of the actuator 43 that is the steering actuator closer to zero. When the control can be performed in this manner, it is possible to suppress an extreme change in the behavior of the vehicle when the control is switched from the steering angle control to the braking force control. Specifically, based on the yaw rate value acquired by the yaw rate sensor mounted on the vehicle, the control is performed so that the actual yaw rate occurring in the vehicle gradually approaches the commanded yaw rate. Thus, the steering control process ends.

In step S404, the instruction output unit 22 of the vehicle control device 20 may cause the powertrain control unit 31 to perform the control for causing the actuator 41 functioning as the brake actuator to generate a braking force for realizing the yaw rate based on the yaw rate serving as the control command after arbitration. Further, when the yaw rate serving as the control command after arbitration is realized with the driving force rather than the braking force, the instruction output unit 22 may cause the powertrain control unit 31 to perform the control for causing the actuator 41 functioning as the drive actuator to generate the driving force for realizing the yaw rate. That is, in order to realize the lateral momentum derived by the arbitration unit 21 with the yaw rate, only the brake actuator may be controlled, only the drive actuator may be controlled, or both the brake actuator and the drive actuator may be controlled.

When the system including the actuator 43 is not operating normally and the braking force control or the driving force control by the brake device or the powertrain is performed to realize the lateral momentum, the execution units 11 to 13 may be notified that the system including the actuator 43 is not operating normally. By notifying the execution units 11 to 13 of such a state, it is possible to take an evacuation action to cause the vehicle to travel to a safe place and stop based on the instructions from the execution units 11 to 13.

Operations and Effects

As described above, in the vehicle control device according to the second embodiment of the disclosure, the arbitration unit acquires, as the control commands, the steering angle and the yaw rate (or the steering angle and the information that allows the yaw rate to be specified) that are the control amounts that allow the control of the actuators different from each other regarding the lateral movement of the vehicle, from the driving support applications of the execution units at substantially the same time.

By setting the control commands to such control amounts, the arbitration unit can prepare the control of the brake actuator or the drive actuator based on the yaw rate in parallel with the control of the steering actuator based on the steering angle when acquiring the control commands from the driving support applications of the execution units. Thus, even if the system including the steering actuator is not operating normally and the steering angle indicated by the control command of the driving support application cannot be realized by the steering actuator, the brake actuator or the drive actuator can be controlled based on the yaw rate without inquiring the execution unit and waiting for a new control command. Thus, it is possible to realize, with the braking force or the driving force, a turning performance that is originally exhibited by the steering force. As a result, it is possible to reduce situations where the behavior of the vehicle does not become as expected or the responsiveness of the vehicle deteriorates, so that the lateral movement of the vehicle can be appropriately controlled.

The arbitration unit 21 may determine whether the control command after arbitration can be realized only by controlling the steering actuator (first embodiment) and whether the system including the steering actuator is operating normally (second embodiment) simultaneously. For example, the arbitration unit 21 may first determine whether the system including the steering actuator is operating normally, and when the system is operating normally, then determine whether the control command after arbitration can be realized only by controlling the steering actuator.

Although the embodiments of the disclosure have been described above, the disclosure can be construed as a vehicle control device, a steering control method performed by a vehicle control device including a processor and a memory, a steering control program for performing a steering control method, a computer-readable non-transitory storage medium that stores a steering control program, a system including a vehicle control device, application execution units, actuator control units, and actuators, or a vehicle equipped with the system.

The disclosure can be used for a vehicle control device.

What is claimed is:

1. A vehicle control device comprising:
an arbitration unit configured to:
acquire steering angles and yaw rates serving as control commands from a plurality of driving support applications that respectively implements driving support functions, wherein
each of the plurality of driving support applications is respectively executed by an execution unit that is implemented by an electronic control unit;
arbitrate the steering angles and yaw rates serving as the control commands by selecting a control command from the steering angles and the yaw rates acquired, based on a predetermined selection criterion;
derive a lateral momentum based on a result of arbitrating the steering angles and the yaw rates;
output instructions based on the derived lateral momentum to a first control unit configured to control a steering actuator and a second control unit configured to control at least one of a brake actuator or a drive actuator;
output an instruction based on at least a steering angle serving as a control command after arbitration to the first control unit in a case where the control command after arbitration is able to be realized only by controlling the steering actuator; and
output an instruction based on at least a yaw rate serving as the control command after arbitration to the second control unit in a case where the control command after arbitration is not able to be realized only by controlling the steering actuator,
wherein the case where the control command after arbitration is not able to be realized only by controlling the steering actuator is a case where the steering angle serving as the control command after arbitration deviates, by a predetermined value or more, from an actual steering angle of the steering actuator that has operated in accordance with the instruction based on the steering angle.

2. The vehicle control device according to claim 1, wherein the arbitration unit acquires the steering angles and the yaw rates as the control commands from the driving support applications at substantially the same time.

3. The vehicle control device according to claim 1, wherein the arbitration unit acquires a data frame including the steering angles and the yaw rates as the control commands from the driving support applications.

4. The vehicle control device according to claim 1, wherein the brake actuator is able to distribute a braking force between right and left wheels.

5. The vehicle control device according to claim 1, wherein the drive actuator is able to distribute a driving force between right and left wheels.

6. A vehicle control device comprising:
an arbitration unit configured to:
acquire information that allows steering angles and yaw rates serving as a plurality of control commands to be specified from each of a plurality of driving support applications, the driving support applications respectively implementing driving support functions, wherein
each of the plurality of driving support applications is respectively executed by an execution unit that is implemented by an electronic control unit;
arbitrate the steering angles and yaw rates serving as the control commands by selecting a control command from the plurality of control commands acquired, based on a predetermined selection criterion;
derive a lateral momentum based on a result of arbitrating the steering angles and the yaw rates;
output an instruction based on the derived lateral momentum to a first control unit configured to control a steering actuator and a second control unit configured to control at least one of a brake actuator and a drive actuator;
output an instruction based on at least a steering angle serving as a control command after arbitration to the first control unit in a case where the control command after arbitration is able to be realized only by controlling the steering actuator; and
output an instruction based on at least a yaw rate serving as the control command after arbitration to the second control unit in a case where the control command after arbitration is not able to be realized only by controlling the steering actuator,
wherein the case where the control command after arbitration is not able to be realized only by controlling the steering actuator is a case where the steering angle serving as the control command after arbitration deviates, by a predetermined value or more, from an actual steering angle of the steering actuator that has operated in accordance with the instruction based on the steering angle.

7. A vehicle control device comprising:
an electronic control unit configured to:
acquire steering angles and yaw rates serving as control commands from a plurality of driving support applications that respectively implements driving support functions, wherein
each of the plurality of driving support applications is respectively executed by an execution unit that is implemented by the electronic control unit;
arbitrate the steering angles and yaw rates serving as the control commands;
derive a lateral momentum based on a result of arbitrating the steering angles and the yaw rates;
output instructions based on the derived lateral momentum to a first control unit configured to control a steering actuator and a second control unit configured to control at least one of a brake actuator or a drive actuator;
output an instruction based on at least a steering angle serving as a control command after arbitration to the first control unit in a case where the control command after arbitration is able to be realized only by controlling the steering actuator; and output an instruction based on at least a yaw rate serving as the control command after arbitration to the second control unit in a case where the control command after arbitration is not able to be realized only by controlling the steering actuator, wherein the case where the control command after arbitration is not able to be realized only by controlling the steering actuator is a case where the steering angle serving as the control command after arbitration deviates, by a predetermined value or more, from an actual steering angle of the steering actuator that has operated in accordance with the instruction based on the steering angle.

* * * * *